July 5, 1938.  W. G. DOST  2,122,880
FEEDER FOR PERCHING FOWL
Filed Aug. 31, 1936
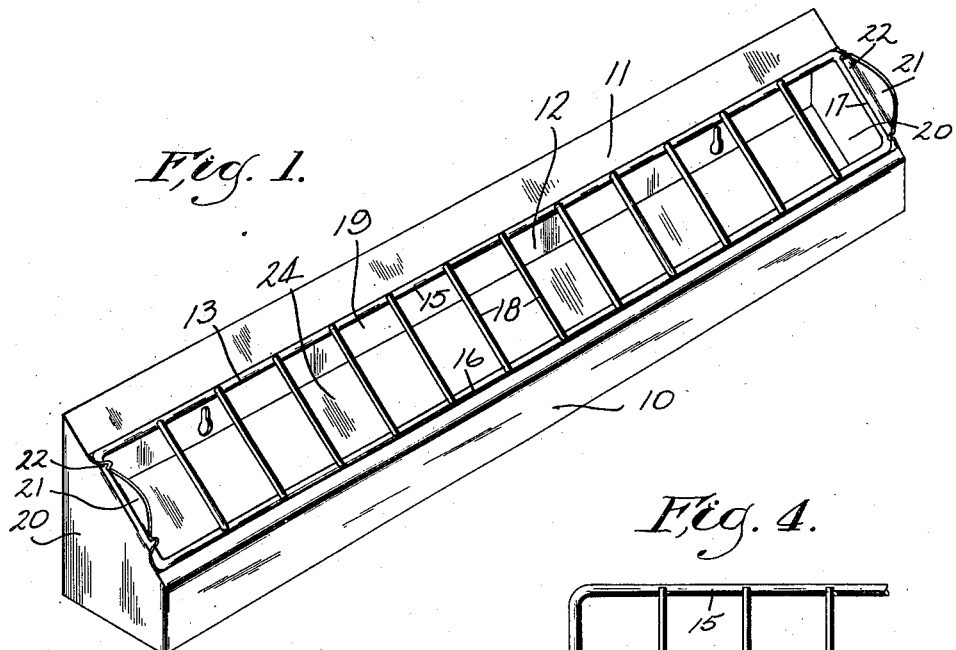
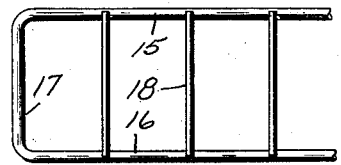
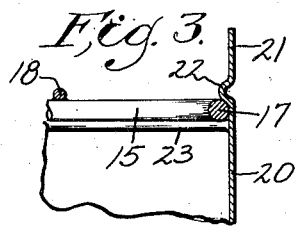
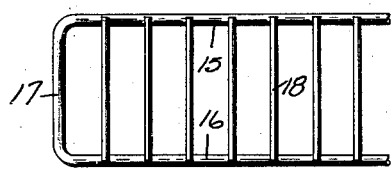
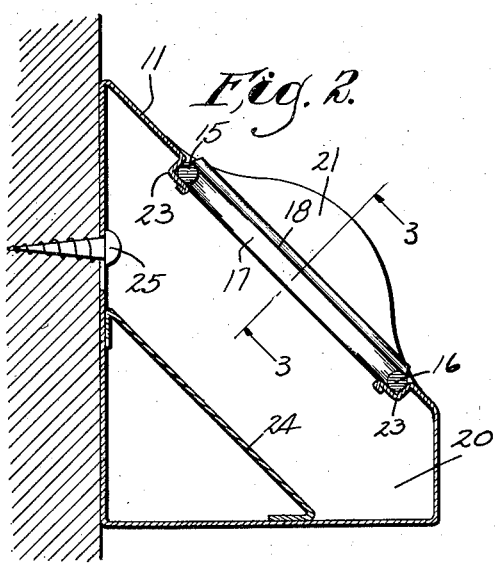
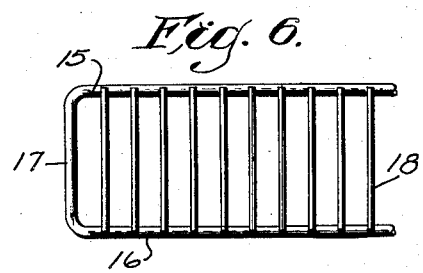
INVENTOR
Walter G. Dost
BY
Wheeler, Wheeler and Wheeler
ATTORNEYS Patented July 5, 1938

2,122,880

UNITED STATES PATENT OFFICE 2,122,880

FEEDER FOR PERCHING FOWL

Walter G. Dost, Whitefish Bay, Wis.

Application August 31, 1936, Serial No. 98,636

2 Claims. (Cl. 119—61)

My invention relates to improvements in feeders for perching fowl.

The object of my invention is to provide a special receptacle for feed, to be made available to fowl which are inclined to perch upon any available suitable support, and it is therefore the primary object of my invention to provide a feeder which has no available suitable support upon which fowl may perch.

Another object of my invention is to provide a single feeder device which, by means of arrangeable inserts, may be used as a feeder for various sizes of fowl.

In the drawing:

Figure 1 is a perspective of my complete feeder with an insert for a particular size of fowl.

Figure 2 is a vertical section through a portion of a wall structure and through my feeder.

Figure 3 is a detail in vertical section on line 3—3 of Fig. 2 showing a portion of the end of my feeder.

Figure 4 is a plan view of a guard insert for use in a feeder for large fowl.

Figure 5 is a guard insert for use in a feeder for intermediate size fowl.

Figure 6 is a guard insert for my feeder when it is used by chicks.

Like parts are identified by the same reference characters throughout the several views.

Various efforts have been made to prevent perching fowl from fouling the feed which is provided for them in open, or even in guarded, receptacles, it being common knowledge that as to practically all feeders approximately 20% or more of the feed placed therein is made unusable by the fowl fouling the feed in the feeder.

I have therefore provided a feeder 10 which is so constructed as to prevent the chickens or other fowl from perching in a position to foul the feed in the feeder.

The feeder 10 is shaped as to its vertical section in the form of a trapezoid, the top 11 of which is at such an angle from the horizontal as to make it an uncomfortable and actually an impossible perching location, and I have found that an angle of approximately 45 degrees or more will accomplish this end. The space 12 within the feeder is of course used to receive a quantity of feed disposed for ready access as the fowl stand in front of the feeder and reach for the feed through the spaces between removable guard inserts 13. These guard inserts are made in various sizes, as shown in Figs. 4, 5, and 6. Each comprises an upper rail 15 and a lower rail 16 and end rails 17 which complete a rectangular frame across the narrow dimension of which are guard strips 18. The guard strips 18 are spaced differently for various sizes of fowl. The spacing in the guard insert in Fig. 4 is for larger fowl and the strips are on two and five-eighths inch centers. The guard strips in Fig. 5 are on narrower centers for intermediate fowl, and I have found that the spacing is preferably one and five-eighths inches. The strips in the guard insert shown in Fig. 6 are on seven-eighths inch centers and are for the small chicks.

The rectangular frame including the rails 15, 16 and 17 is of such dimension as to guard the opening 19 in the top of the feeder. The ends 20 of the feeder are provided with upstanding ears 21 which are grooved at 22 to provide an inwardly extending detent. Since the ears 21 are made of resilient material, the guards snap into position under the detents and are therefore held tightly against an inset flange 23 extending along the upper and lower margins of the opening 19.

At 24, in Fig. 2, I have shown a removable slide strip which may be placed in the back corner of the feeder to force the feed toward the forward part of the feeder in a position where it may be reached by smaller chicks.

My feeder is adapted, as shown in Figs. 1 and 2, to alternative setting either upon the floor against the wall or in a hanging position upon screws 25 upon a wall adjacent the floor and within reach of the particular size of fowl to be served.

When my fowl feeder is positioned as shown in Fig. 2, upon a wall, it will be noted that the width of the feeder is such as to provide little or no room for a perching fowl, no matter how persistent that fowl may be in attempting to obtain a position of comfort upon the guards 13. I have found that a width of approximately five inches is sufficiently small to prevent fowl from perching on my feeder, and this, together with the fact that the feeder top 11 is at an angle too steep to provide a comfortable perching position, makes my feeder completely free from the usual perching and fouling that results from the use of other feeders.

I claim:

1. In a feeder for perching fowl, a feed container provided with ends having upstanding ears inwardly grooved to provide inwardly extending detents, a sloping apertured top for the feed container having guard receiving means for said aperture, and a guard frame provided with spaced guard strips to be received against said means in protective relation to the feed and held in position by said detents.

2. In a feeder for perching fowl, a feed container provided with ends having upstanding ears inwardly grooved to provide inwardly extending detents, a sloping apertured top for the said container, the margins of the aperture thereof being inset to provide a flange abutment, and a guard frame provided with spaced guard strips to be received against said flange in protective relation to the feed and held in position by said detents.

WALTER G. DOST.